C. P. CHAMBERLIN.
DUPLEX JOINT FOR WINDSHIELDS.
APPLICATION FILED OCT. 11, 1916.

1,360,721.

Patented Nov. 30, 1920.

WITNESS

INVENTOR.
CLARENCE P. CHAMBERLIN.

BY

ATTORNEY.

UNITED STATES PATENT OFFICE.

CLARENCE P. CHAMBERLIN, OF BIRMINGHAM, MICHIGAN, ASSIGNOR TO JOSEPH N. SMITH & COMPANY, OF DETROIT, MICHIGAN, A CORPORATION OF MICHIGAN.

DUPLEX JOINT FOR WINDSHIELDS.

1,360,721.                Specification of Letters Patent.    Patented Nov. 30, 1920.

Application filed October 11, 1916. Serial No. 124,936.

*To all whom it may concern:*

Be it known that I, CLARENCE P. CHAMBERLIN, a citizen of the United States, residing at Birmingham, county of Oakland, State of Michigan, have invented a certain new and useful Improvement in Duplex Joints for Windshields, and declare the following to be a full, clear, and exact description of the same, such as will enable others skilled in the art to which it pertains to make and use the same, reference being had to the accompanying drawings, which form a part of this specification.

This invention relates to duplex hinge joint for windshields of the sectional type and more particularly to the friction hinge connection between one of the sections and a storm shield section extending forwardly thereof of a form allowing the parts to be respectively adjusted. An object of the invention is a duplex joint or pivot hinge enabling two of the windshield sections to be concentrically mounted and independently adjusted relative one to the other. Another object of the invention is a duplex joint for the concentric mounting of two movable parts of a windshield enabling the sections to be independently adjusted and of a construction to allow the two sections to be removed as a unit from the supporting frames. Another object of the invention is a simple and inexpensive construction of the parts for accomplishing the above named objects.

These and other objects and the several novel features of the invention in its preferred form are hereinafter more fully described and claimed and shown in the accompanying drawings in which—

Similar characters refer to similar parts throughout the drawing and specification.

Figure 2:
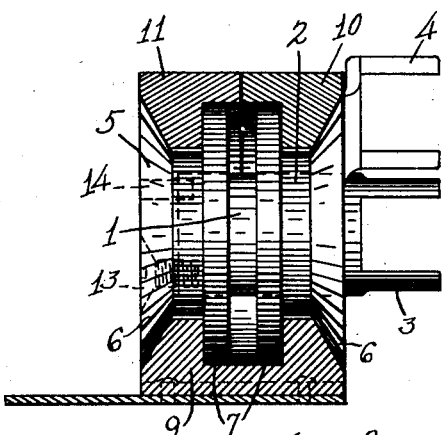
Fig. 2 is a cross section of the joint taken on line *x—x* of Fig. 1.

As will be readily understood from the drawing the joint is formed of two concentric parts 1 and 2, and to each of the parts respectively is secured a channel portion 3 and 4 for receiving the respective shield sections. The part 1 is cylindrical in form and, as is indicated by dotted lines in Fig. 2, extends through the part 2, and this portion 1 has a part or member 5 secured to the end thereof similar in form to the part 2. The two parts 2 and 5 have similar coned flanges 6 which are oppositely disposed in the assembled joint, and spaced therefrom on the opposite end of the members 2 and 5 are the flat faced flanges 7. In the assembled joint these members 2 and 5 are positioned with the flanges 7 adjacent to, but spaced one from the other.

The windshield frames 8, on opposite sides of the vehicle body as will be understood, are each provided with a bearing member 9 formed to receive the two members 2 and 5 on each side of the windshield sections. The bearing is formed to engage in the space between the flanges 6 and 7 on each of the members and, as will be understood from Figs. 1 and 2, a binding member 10 is provided to engage in the member 2, and a binding member 11 of similar form is provided to engage in the member 5. The bearing member 9 and the caps 10 and 11 having a form complementary to the form of the members 2 and 5 and holding the said members in position and from longitudinal movement relative one to the other.

Figure 1:
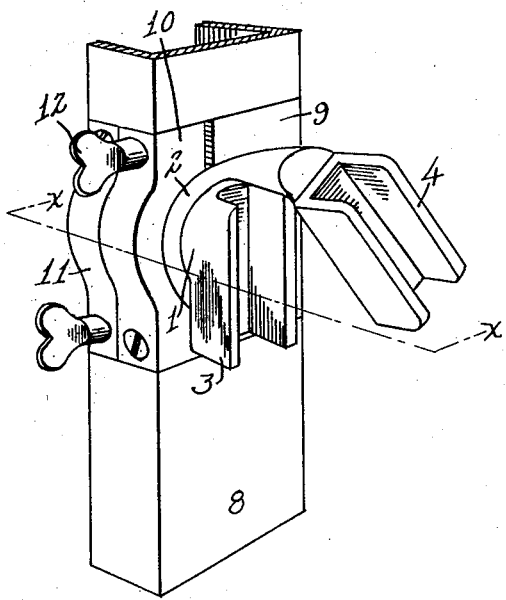
Figure 1 is a perspective view of a windshield joint embodying my invention showing a portion of the frame in which the joint is mounted and the joint to which the windshield sections are attachable.
Figure 3:
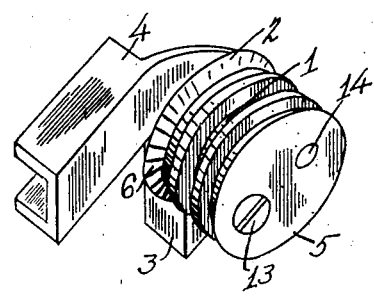
Fig. 3 is a perspective view of the assembled rotatable portions of the joint disassembled from the frame.

The caps 10 and 11 are apertured at opposite ends and the bearing member 9 is provided with threaded apertures to receive screws inserted in the apertures in the cap members and one of the screws of each cap member is of the nature of a thumb screw, as indicated at 12 in Fig. 1, to enable the cap member to be readily loosened or tightened to bindingly engage the companion cone member 2 or 5, as the case may be. The thumb screws of the two cap members 10 and 11 are positioned at opposite ends thereof, as will be understood from Fig. 1 to allow of freedom of movement in the operation thereof.

The coned member 2 is rotatable on the member 1, as will be understood from the drawings, while the similarly coned member 5 is detachably secured to the end of the member 1 and is recessed, as indicated by dotted lines in Fig. 2 to receive the end of the member 1. A screw 13 is used to secure the member 5 to the member 1, which screw is eccentrically positioned relative to the axis of rotation and a pin 14 is provided passing through the member 5 and into the end of the member 1. The screw and pin prevent rotation of the member 5 on the member 1.

With the parts assembled in position, as indicated in Fig. 1, if the screw 12 of the cap 10 be loosened the member 2 and sash connected with the channel portion 4 thereof may be rotated in the bearing or frictionally held in the desired position by tightening the respective thumb screw. Likewise by loosening the thumb screw of the cap member 11, the member 5 and attached section may be readily rotated and, by tightening the thumb nuts, the windshield sections are frictionally held in the set position. The tightening of the thumb screws in both cap members causes the coned face of both members 2 and 5 to be frictionally engaged by the correspondingly coned surfaces of the cap members 10 and 11 and the bearing member 9.

It is also to be noted that the flanges 7 of the members 2 and 5 are spaced apart as heretofore mentioned so that the rotation of the one member may not tend to cause rotation of the other. Furthermore, these flanges 7 fit in the bearing and cap members, as shown, and hold the two members of the joint from movement longitudinally in the bearing.

From the foregoing description it is to be seen that the joint is simple in construction and comparatively inexpensive to manufacture, that it is very efficient in use as considerable bearing surface is provided in order that the parts may be frictionally held by the tightening of the thumb screw, and that the joint is readily assembled as the member 2 is placed on the cylindrical part of the member 1 and then the part 5 secured to the end thereof.

By removing both the cap members 10 and 11, the joints and windshield sections connected therewith may be removed as a unit from the supporting frames on opposite sides of the windshield, as will be readily understood, and the shield sections by reason of the arrangement of the joint are maintained substantially in the desired relationship and may be readily replaced in the frame in the proper respective positions. This ability to attach or detach the sections relative to the frame is of value inasmuch as oftentimes the frames may be built and assembled with the body, and the body finished prior to the assembling of the windshield sections therewith, and the breakage of the glass of the sections or possibility of staining the parts thereof in painting of the body is thus avoided.

Having thus briefly described my invention, its utility and mode of operation, what I claim and desire to secure by Letters Patent of the United States is—

1. In a joint for windshields, a pair of members each independently attachable to a windshield section, the members being rotatable about the same axis and spaced longitudinally thereof, a bearing having a seat for both the said members, and a cap of two parts providing means for independently holding the members from rotation in the bearing.

2. In a joint for windshields, a pair of members each independently attachable to a windshield section, one of said members extending through the other member and both members having a similarly shaped cylindrical portion, said portion being in spaced relation longitudinally of the common axis, a bearing having a seat for both the said members and a cap member for each cylindrical portion adapted to frictionally hold the respective portion from rotation.

3. In a joint for windshields, a pair of members each having a similar circular portion and one of said portions having a part extending through the other of said portions, the said circular portions each having a coned face and being spaced longitudinally of the common axis, a bearing having a seat for both the said circular portions, and an independent cap member for each circular portion.

4. In a joint for windshields, a bearing, a pair of members having similarly formed surfaces, the bearing being formed complementary to the shape of both the members and said members being spaced longitudinally of the axis of the bearing, one of said members having a cylindrical portion attached thereto about which the other of said members may rotate, said cylindrical portion and said rotatably mounted member each being adapted for attachment to a windshield section, and independent means for frictionally holding the members from rotation in the bearing, 5. In a joint for windshields, a pair of members in concentric relation, spaced longitudinally of the axis, a bearing having a seat for both said members, means on each member and extending on the same side of the bearing adapted to receive a windshield section, and independent means for frictionally holding each member from rotation in the bearing.

6. In a joint for windshields, a pair of circular members each having a coned surface and a flange spaced therefrom having a face at a right angle to the body of the member, a bearing for receiving the members having a portion engaging between the coned surface and flange of each member, said members being spaced longitudinally of the axis of the bearing, a cap for each member having a portion engaging between the flanges of the respective member and coöperating with the bearing to bindingly hold the member from rotation and from longitudinal movement in the bearing, each of said circular members being adapted for attachment to a windshield section.

7. In a joint for windshields, a pair of circular members each having a cone shaped portion at one end and a flange at the opposite end, a cylindrical member to which one of said coned members is attached, the other of said members being apertured to receive the cylindrical member and being rotatable thereabout, each of the said members being adapted for attachment to a windshield section, a bearing for receiving the members having a portion engaging said cone shaped parts and recessed to receive the said flanges, said members being spaced longitudinally of the axis of the bearing, a cap for each member having a portion engaging the coned surface of the member and coöperating with the bearing to hold the members from movement longitudinally in the bearing, the cap members being attachable to the bearing, and a thumb screw for each cap for binding the respective member in the bearing.

In testimony whereof I sign this specification.

CLARENCE P. CHAMBERLIN.